United States Patent
Zhong et al.

(10) Patent No.: US 11,827,200 B2
(45) Date of Patent: Nov. 28, 2023

(54) DIGITAL HYDRAULIC ASSISTED BRAKING SYSTEMS WITH HIGH DYNAMIC RESPONSE AND CONTROL METHODS THEREOF

(71) Applicants: ZHEJIANG UNIVERSITY OF TECHNOLOGY, Zhejiang (CN); ZHEJIANG HAIHONG HYDRAULIC TECHNOLOGY CO., LTD., Zhejiang (CN)

(72) Inventors: Qi Zhong, Hangzhou (CN); Enguang Xu, Hangzhou (CN); Jun Wang, Taizhou (CN); Xianjian He, Taizhou (CN); Xingxing Wang, Taizhou (CN); Tiwei Jia, Hangzhou (CN); Cheng Yu, Hangzhou (CN); Junxian Wang, Hangzhou (CN)

(73) Assignees: ZHEJIANG UNIVERSITY OF TECHNOLOGY, Hangzhou (CN); ZHEJIANG HAIHONG HYDRAULIC TECHNOLOGY CO., LTD., Taizhou (CN)

( * ) Notice: Subject to any disclaimer, the term of this patent is extended or adjusted under 35 U.S.C. 154(b) by 0 days.

(21) Appl. No.: 18/192,636

(22) Filed: Mar. 29, 2023

(65) Prior Publication Data
US 2023/0322194 A1 Oct. 12, 2023

(30) Foreign Application Priority Data

Mar. 29, 2022 (CN) .......................... 202210323960.6

(51) Int. Cl.
*B60T 8/171* (2006.01)
*B60T 8/34* (2006.01)
*B60T 8/00* (2006.01)

(52) U.S. Cl.
CPC .............. *B60T 8/171* (2013.01); *B60T 8/341* (2013.01); *B60T 8/344* (2013.01)

(58) Field of Classification Search
CPC ...................................................... B60T 8/344
See application file for complete search history.

(56) References Cited

U.S. PATENT DOCUMENTS

2004/0183367 A1* 9/2004 Kusano ................. B60T 13/148
303/11

FOREIGN PATENT DOCUMENTS

| CN | 105857281 A | 8/2016 | |
| CN | 103569098 B | * 10/2016 | ............ B60W 10/06 |

(Continued)

OTHER PUBLICATIONS

First Office Action in Chinese Application No. 202210323960.6 dated Oct. 9, 2022, 14 pages.

(Continued)

*Primary Examiner* — Melody M Burch
(74) *Attorney, Agent, or Firm* — METIS IP LLC

(57) ABSTRACT

The present disclosure discloses a digital hydraulic assisted braking system with a high dynamic response and a control method thereof. The system includes a two-position two-way digital switch valve A, a controller, an electromagnetic two-position two-way proportional reversing valve, a two-position two-way digital switch valve B, a displacement detection system, and a pressure detection system. When a vehicle starts, a control system of the present disclosure maintains a preload state and responds to a braking at any time. During an emergency braking, the braking system is open. When the vehicle is shut down, the braking system is closed. Compared with an existing braking method, by implementing the braking method of the present disclosure, a braking response time is greatly shortened, a dynamic (Continued)

performance of a braking response period is improved, and a safety of vehicle braking is further guaranteed.

6 Claims, 5 Drawing Sheets

(56) References Cited

FOREIGN PATENT DOCUMENTS

| | | | | |
|---|---|---|---|---|
| CN | 106812939 A | | 6/2017 | |
| CN | 107200001 A | | 9/2017 | |
| CN | 108657219 A | | 10/2018 | |
| CN | 110520341 A | * | 11/2019 | ............ B60T 15/025 |
| DE | 4036940 A | * | 8/1991 | ............ B60T 8/1766 |
| DE | 102018205957 A1 | * | 11/2018 | .............. B60T 13/18 |
| KR | 20090112010 A | * | 10/2009 | |
| WO | 2013083234 A1 | | 6/2013 | |

OTHER PUBLICATIONS

Decision to Grant a Patent in Chinese Application No. 202210323960.6 dated Jan. 28, 2023, 3 pages.

\* cited by examiner

DIGITAL HYDRAULIC ASSISTED BRAKING SYSTEMS WITH HIGH DYNAMIC RESPONSE AND CONTROL METHODS THEREOF

CROSS-REFERENCE TO RELATED APPLICATION

This application claims priority of Chinese Patent Application No. 202210323960.6, filed on Mar. 29, 2022, the contents of each of which are entirely incorporated herein by reference.

TECHNICAL FIELD

The present disclosure relates to the field of a hydraulic braking, and in particular, to a digital hydraulic assisted braking system with a high dynamic response and a control method thereof.

BACKGROUND

A braking system refers to a series of devices that forcibly reduce a driving speed of a vehicle. A main function is to slow down or even stop a moving vehicle and keep the speed of a downhill vehicle stable. A braking response time is a key factor affecting a braking performance. Especially in working conditions of a heavy load, high speed, variable load and huge motion inertia, a long-distance slip usually occurs in a short period of time, which seriously affects a safety of vehicle braking. Therefore, an extremely high requirement is made to the braking performance of the braking system.

At present, the highest technology of a full hydraulic braking is an electro-hydraulic proportional braking control technology. As a proportional valve has a median dead zone, a pressure response of the brake is slow and a braking process lags behind. There is an internal leakage in the proportional valve, which makes it difficult to stabilize the brake pressure for a long time, causing a low control accuracy. At the same time, a spool valve structure of the proportional valve has the extremely high requirement on a cleanliness of the oil. An oil pollution may cause the spool to stick, which causes the brake to fail to brake effectively, a poor reliability, and difficulty in meeting a requirement of high dynamic response braking under a complex working condition. A digital hydraulic technology adopts a digital switch valve as a core control element, which has a fast frequency response, and a discrete fluid generated by a high-frequency opening and closing may assimilate an effect of continuous fluid control after fusion in a pipeline. In this way, its control accuracy is high, and it only has two conditions, namely opening and closed, making the control element not sensitive to the cleanliness of the oil, so it has a stronger anti-pollution ability and a faster response. However, while simply changing the proportional valve to the digital switch valve improves the response speed, it is easy to cause a pressure fluctuation in an oil tank, thereby affecting a brake pressure accuracy.

SUMMARY

A purpose of the present disclosure is to overcome deficiencies of the current technique and provide digital hydraulic assisted braking system with a high dynamic response and a control method thereof. When the vehicle starts, a control system of the present disclosure maintains a preload state and responds to braking at any time. During an emergency braking, the braking system is open; when the vehicle is shut down, the braking system is closed. Compared with an existing braking method, by implementing the braking method of the present disclosure, a braking response time is greatly shortened, a dynamic performance of a braking response period is improved, and safety of vehicle braking is further guaranteed.

The present disclosure firstly provides a digital hydraulic assisted braking system with high dynamic response, including a two-position two-way digital switch valve A, a controller, an electromagnetic two-position two-way proportional reversing valve, a two-position two-way digital switch valve B, a displacement detection system, and a pressure detection system.

The controller is respectively connected to the displacement detection system and the pressure detection system to obtain a corresponding detection signal; the controller is respectively connected to the two-position two-way digital switch valve A, the electromagnetic two-position two-way proportional reversing valve, and the two-position two-way digital switch valve B to control them, and the controller is further configured to control an external liquid filling system.

The displacement detection system is configured to obtain a displacement signal of an external pedal device; and the pressure detection system is configured to obtain a pressure signal of a brake cylinder of an external brake.

The electromagnetic two-position two-way proportional reversing valve and an oil inlet of the two-position two-way digital switch valve A are connected to the external liquid filling system, wherein the oil inlet of the two-position two-way digital switch valve A is further connected to an accumulator, and the electromagnetic two-position two-way proportional reversing valve and an oil outlet of the two-position two-way digital switch valve A are connected to the brake cylinder of the external brake; the oil inlet of the two-position two-way digital switch valve B is connected to the brake cylinder of the external brake, and the oil outlet port of the two-position two-way digital switch valve B is connected to an external oil tank.

Further, the controller may further obtain the pressure signal of the external accumulator.

Further, the brake includes the brake cylinder, the brake friction block and the brake disc, the load spring inside the brake cylinder transmitting the brake pressure to the brake friction block; when the brake pressure reaches the target brake pressure $P_0$, a squeeze friction is generated between the brake friction block and the brake disc.

The present disclosure further discloses a control method of a digital hydraulic assisted braking system with high dynamic response, which includes the following operations:
1) the controller collects the corresponding detection signal in real time through the displacement detection system and the pressure detection system.
2) a preload state: when a vehicle is started, the controller transmits an optimal duty cycle $\beta_1$ and a driving frequency signal $f_1$ to the two-position two-way digital switch valve A according to a feedback signal of the pressure detection system, and the controller transmits an optimal valve opening $\gamma$ to the electromagnetic two-position two-way proportional reversing valve. The two-position two-way digital switch valve A quickly responds to build pressure; at the same time, the electromagnetic two-position two-way proportional reversing valve also starts to respond, and starts to build pressure after crossing a dead zone. Oil liquid is mixed into the brake cylinder after passing through the two-position two-way digital switch valve A and the electromagnetic two-position two-way proportional reversing valve. As the pressure of the brake cylinder increases, a load spring of the brake is gradually compressed to a target pre-compression volume $\Delta x1$, and a brake pressure is raised to a preload brake pressure $P_{pre}$. When the brake pressure $P_{pre}$ is reached, the controller transmits an optimal duty cycle $\beta_2$ and a driving frequency signal $f_2$ to the two-position two-way digital switch valve B, so that excess oil returns to the oil tank through the oil outlet of the two-position two-way digital switch valve B. When the pressure of the brake cylinder drops, the oil is replenished through the two-position two-way digital switch valve A and the electromagnetic two-position two-way proportional reversing valve, and an effect of precise pressure control is achieved under an action of high-frequency drive.

3) an open state: when the controller receives the displacement signal of the pedal device obtained by the displacement detection system, the controller updates the optimal duty cycle $\beta_1$ and the driving frequency signal $f_1$ of the two-position two-way digital switch valve A, and updates the optimal valve opening $\gamma$ at the same time. The two-position two-way digital switch valve A and the electromagnetic two-position two-way proportional reversing valve quickly respond to the signal and quickly build the pressure. The load spring is further compressed from the target pre-compression volume $\Delta x1$ to a target compression volume $\Delta x2$, and a brake friction block and a brake disc of the brake squeezes and rubs to achieve a braking effect. The brake pressure rises from the preload brake pressure $P_{pre}$ to the target brake pressure $P_0$ in a very short period of time, and the controller updates the optimal duty cycle $\beta_2$ and the drive frequency signal $f_2$ of the two-position two-way digital switch valve A to ensure that the brake pressure is maintained at the target brake pressure $P_0$, thereby achieving a precise pressure control.

When a brake instruction signal is cancelled, the brake system switches from the open state to the preload state. The brake system starts to depressurize, the brake pressure drops from a previous target brake pressure $P_0$ to the preload brake pressure $P_{pre}$, and the compression volume of the load spring returns to the target pre-compression volume $\Delta x1$, which prepares for a next brake instruction signal.

4) a closed state: when the controller detects that the vehicle is shut down, the brake system switches from the preload state to the closed state, the two-position two-way digital switch valve A and the electromagnetic two-position two-way proportional reversing valve are closed, the oil liquid returns to the oil tank through the two-position two-way digital switch valve B, and the compression volume of the load spring returns to 0 from the target pre-compression volume $\Delta x1$.

Further, a range of the driving frequency signal $f_1$ and $f_2$ is 100-300 Hz, and a range of the duty cycle $\beta_1$ and $\beta_2$ is 0-100%.

Further, the preload brake pressure $P_{pre}$ is 70%-85% of the target brake pressure $P_0$.

Further, a pressure of the accumulator detected by the controller is inadequate, the controller transmits a control signal $\alpha$ to the liquid filling system, and the liquid filling system fills the accumulator with liquid to supplement the pressure.

Compared with the exiting technique, the present disclosure has following beneficial effects.

The present disclosure proposes a structure that combines the digital switch valve with a traditional proportional valve, and adopts a digital pressure building mode followed by a proportional and digital composite pressure building mode, which reduces the braking response time while braking with a great flow rate, and through a high-frequency opening and closing of the digital switch valve, an effect of precise regulation of the brake pressure is achieved, which solves problems of slow pressure response and great fluctuation of the braking pressure in the exiting technique.

The present disclosure has a preload state, and the brake pressure is raised to the preload brake pressure in advance to make it slightly lower than the target brake pressure. When the brake signal comes, the digital switch valve is opened and closed at the high frequency, and the target braking pressure is quickly reached in a short time, which reduces the braking response time, improves the dynamic response performance in the braking period, and solves the problem of slow pressure response in the current technique.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which the same reference numbers represent the same structures, wherein.

Figure 1:
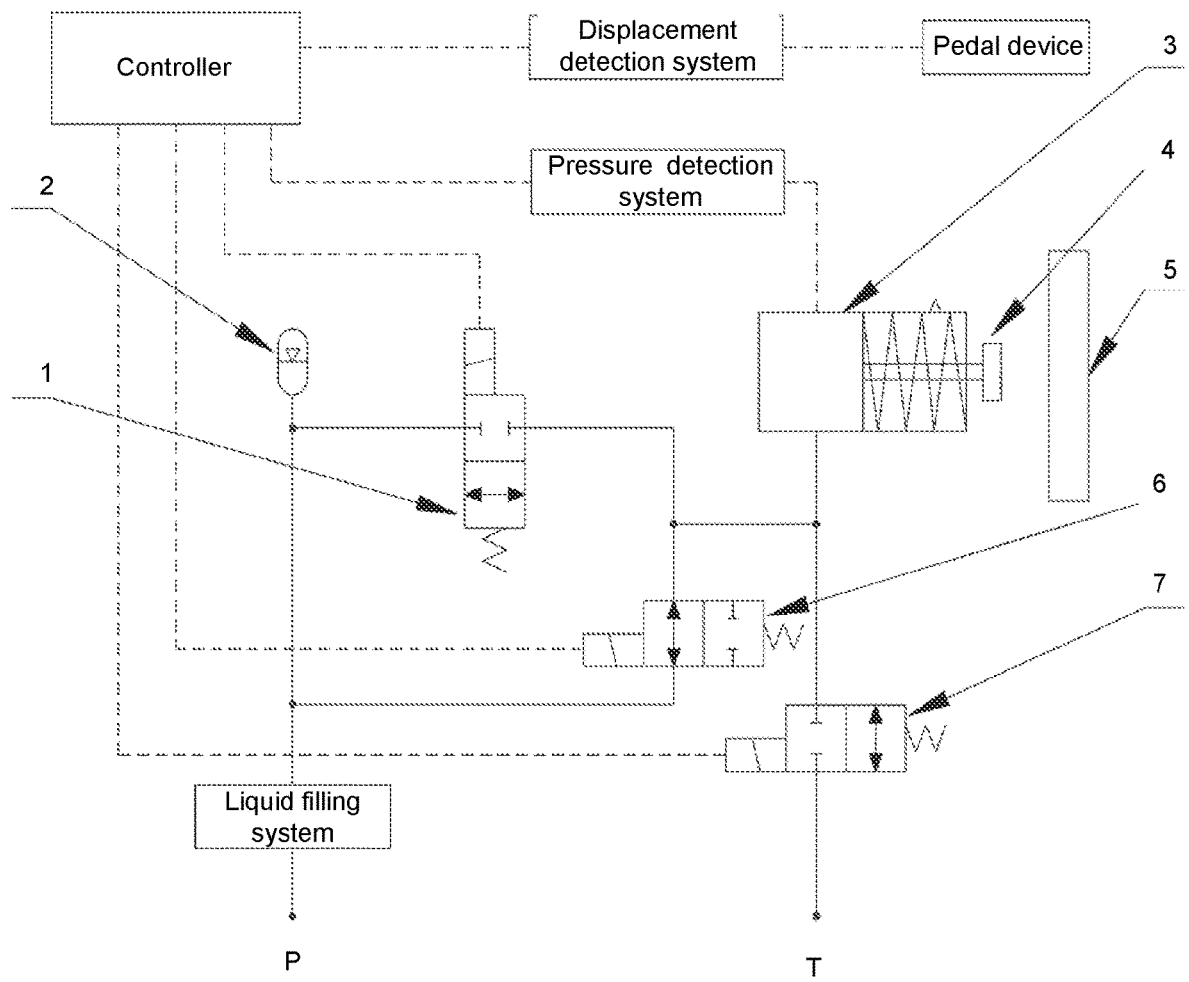
FIG. 1 is a schematic diagram illustrating a principle of a digital hydraulic assisted braking system with high dynamic response according to some embodiments of the present disclosure.
Figure 2:
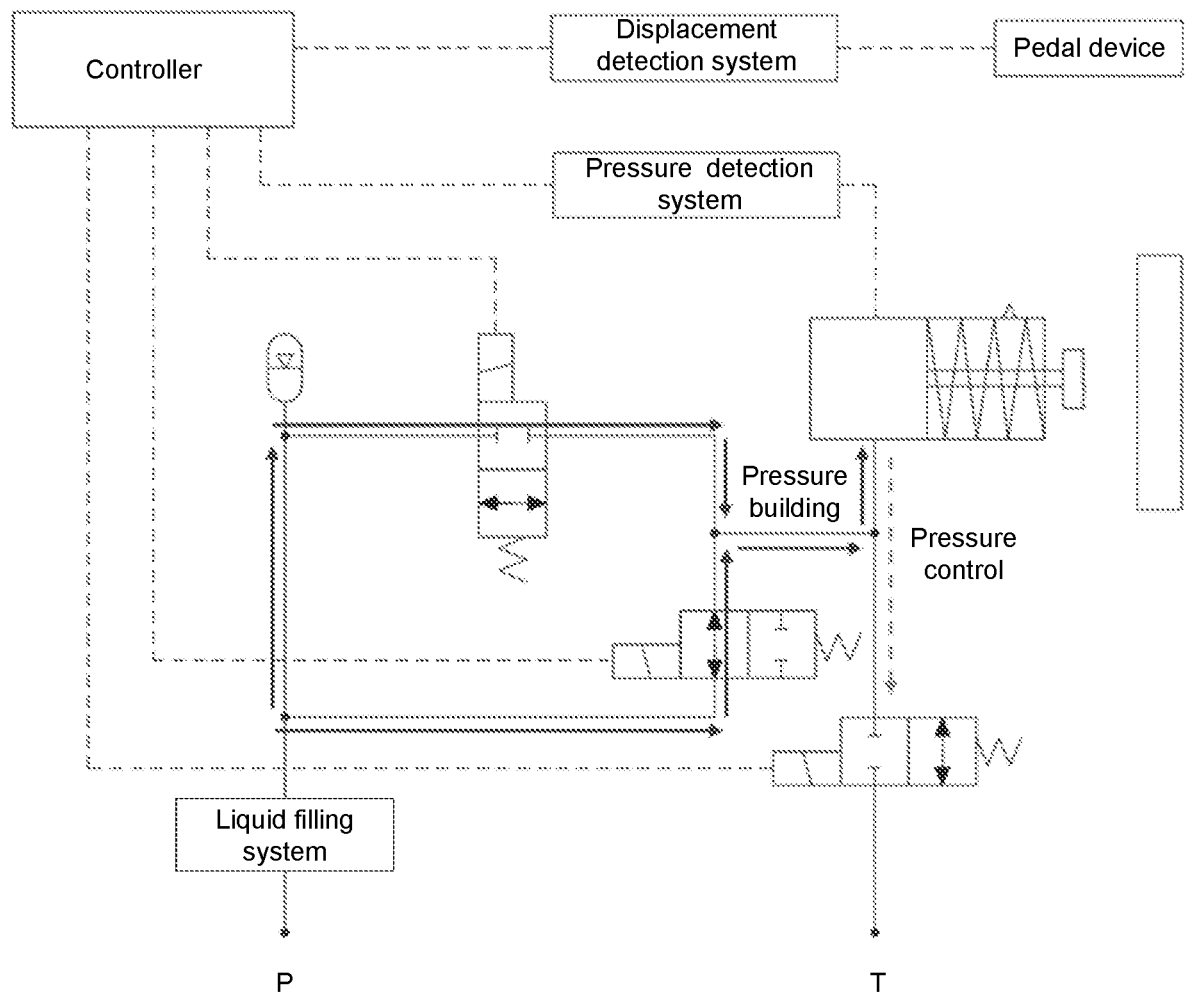
FIG. 2 is a schematic diagram illustrating a principle of a digital hydraulic assisted braking system with high dynamic response in a preload state according to some embodiments of the present disclosure.
Figure 3:
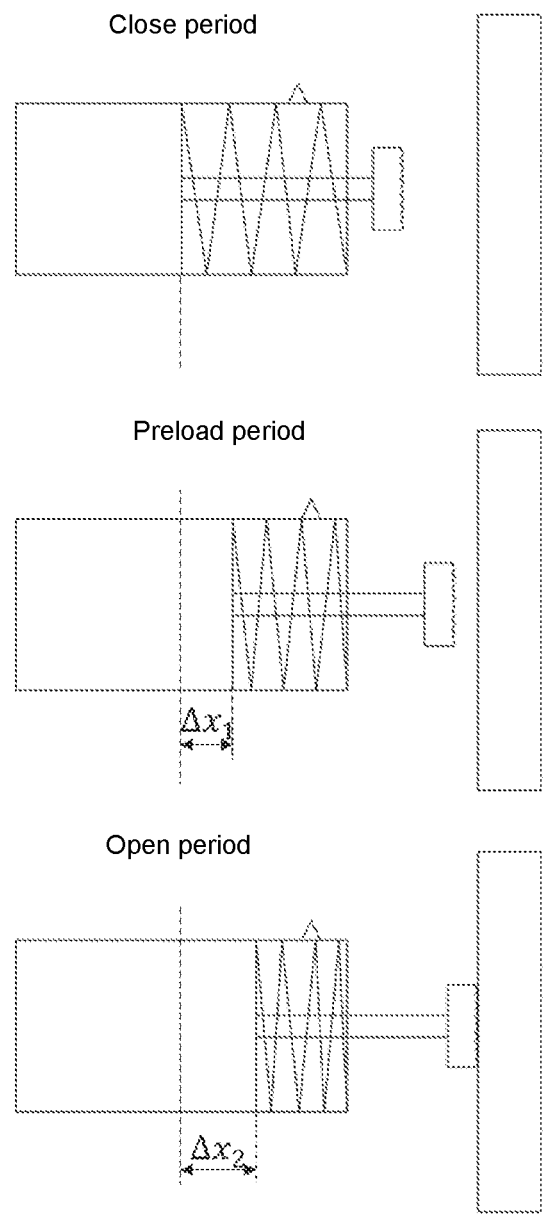
FIG. 3 is a comparison diagram illustrating the states of a brake friction block and a brake disc according to some embodiments of the present disclosure.

In the drawings, 1—a two-position two-way digital switch valve A, 2—an accumulator, 3—a brake cylinder, 4—the brake friction block, 5—a brake disc, 6—an electromagnetic two-position two-way proportional reversing valve, and 7—a two-position two-way digital switch valve B.

DETAILED DESCRIPTION

The present disclosure will be further elaborated and described as follow in combination with specific embodiments. The embodiments are merely examples of the present disclosure and do not make a limitation to the scope of the present disclosure. The technical features of the various implementations in the present disclosure may be combined accordingly on the premise that there is no conflict with each other.

As shown in FIG. 1, a digital hydraulic assisted braking system with high dynamic response of the embodiment includes a two-position two-way digital switch valve A1, a controller, an electromagnetic two-position two-way proportional reversing valve 6, a two-position two-way digital switch valve B7, a displacement detection system, and a pressure detection system. The controller respectively transmits an input signal α of the liquid filling system, a duty circle modulation signal $β_1$ (0-100%) of the two-position two-way digital switch valve A1, a driving frequency signal $f_1$ (100-300 Hz), a duty circle modulation signal $β_2$ (0-100%) of the two-position two-way digital switch valve B7, a driving frequency signal $f_2$ (100-300 Hz), and a valve opening γ of a proportional valve.

The displacement detection system is configured to obtain a displacement signal of an external pedal device. The pressure detection system is configured to obtain a pressure signal of a brake oil tank of an external brake.

The electromagnetic two-position two-way proportional reversing valve 6 and an oil inlet of the two-position two-way digital switch valve A1 are connected to an external liquid filling system, and the oil inlet of the two-position two-way digital switch valve A1 is further connected to an accumulator 2, the electromagnetic two-position two-way proportional valve 6 and the oil outlet of the two-position two-way digital switch valve A1 are connected to a brake cylinder 3 of the external brake. The oil inlet of the two-position two-way digital switch valve B7 is connected to the brake cylinder 3 of the external brake, and the oil outlet of the two-position two-way digital switch valve B7 is connected to the external oil tank.

The liquid filling system is configured to fill the accumulator 2 with liquid to ensure that the accumulator 2 may provide sufficient braking pressure. When the controller detects that the pressure of the accumulator 2 is insufficient, the controller transmits a control signal to the liquid filling system, and the liquid filling system fills liquid to the accumulator 2 to supplement the pressure. A size of the target braking pressure $P_0$ is determined by a stroke of the pedal device, that is, the greater the stroke distance is, the greater the target braking pressure is.

A preload state: when a vehicle is started, the controller transmits an optimal duty cycle $β_1$ and a driving frequency signal $f_1$ to the two-position two-way digital switch valve A according to a feedback signal of the pressure detection system, and transmits an optimal valve opening γ to the electromagnetic two-position two-way proportional reversing valve 6. The two-position two-way digital switch valve A1 quickly responds to build pressure; at the same time, the electromagnetic two-position two-way proportional reversing valve 6 also starts to respond, and starts to build pressure after crossing a dead zone; and oil liquid is mixed into the brake cylinder 3 after passing through the two-position two-way digital switch valve A1 and the electromagnetic two-position two-way proportional reversing valve 6. As the pressure of the brake cylinder 3 increases, a load spring of the brake is gradually compressed to a target pre-compression volume Δx1, and a brake pressure is raised to a preload brake pressure $P_{pre}$. When the brake pressure $P_{pre}$ is reached, the controller transmits an optimal duty cycle $β_2$ and a driving frequency signal $f_2$ to the two-position two-way digital switch valve B, so that excess oil returns to the oil tank through the oil outlet of the two-position two-way digital switch valve B7. When the pressure of the brake cylinder 3 drops, the oil is replenished through the two-position two-way digital switch valve A1 and the electromagnetic two-position two-way proportional reversing valve 6, and an effect of precise pressure control is achieved under an action of high-frequency driving.

In some embodiments, the controller may determine different preload states according to different driving conditions of the vehicle. The preload states may include whether to perform the preload and the size of the preload pressure. The driving condition may include a road surface flatness, a vehicle speed, a steering frequency, etc. The road surface flatness refers to the flatness of the road surface, which can be obtained by a vehicle sensor. The greater the road surface flatness is, the flatter the road surface is. The steering frequency may be a count of times of the vehicle turning a steering wheel within a unit time (e.g., 10 minutes, 30 minutes, etc.). In some embodiments, the driving condition may be indicated in a form of a driving condition vector as $(m_1, m_2, m_3, \ldots)$, where $m_1$ indicates the road surface flatness, $m_2$ indicates the vehicle speed, $m_3$ indicates the steering frequency, etc.

In some embodiments, the controller may determine the preload state according to the road surface flatness. For example, the greater the road surface flatness is, the smaller the preload pressure is. When the road surface flatness is greater than a set threshold, the preload is not performed. In some embodiments, the controller may determine the preload state based on the steering frequency. For example, the smaller the steering frequency is, the smaller the corresponding preload pressure is. When the steering frequency is less than the set threshold, the preload is not performed. In some embodiments, the controller may determine the preload state based on the vehicle speed. For example, the smaller the vehicle speed is, the smaller the corresponding preload pressure is; when the vehicle speed is lower than the set threshold, the preload is not performed.

In some embodiments, the controller may determine the preload state of the vehicle under different driving conditions through a vector database matching. A vector database refers to a database configured to store, index, and query vectors. Through the vector database, similarity queries and other vector management may be quickly performed on a greater count of vectors. In some embodiments, the vector database may include a reference vector formed by a plurality of sets of historical road surface flatness, historical vehicle speed, and historical steering frequency, and corresponding recommended preload states. The recommended preload state may be a preload state determined by an expert or according to an experiment that can effectively guarantee a safety and a performance of the braking system. In some embodiments, the controller may match the reference vector satisfying a first preset condition from the vector database according to a current driving situation vector, and determine the recommended preload state corresponding to the reference vector as a current preload state. The first preset condition may include that a distance between the reference vector and the current driving situation vector (e.g., a cosine distance, a Euclidean distance, a Manhattan distance, a Chebyshev distance, etc.) is minimum or meets a preset threshold, etc.

In some embodiments, the controller may further determine the preload state through other modes. For example, the controller may determine the preload state through a machine learning model based on the driving condition of the vehicle.

In some embodiments of the present disclosure, different preload states are determined according to different driving conditions, which can improve the braking response while avoiding an adverse effect of a long-time preload on the braking system (such as an accidental braking, an excessive energy consumption, an aging and wear of the braking system, etc.). The preload state may be more efficiently and accurately determined through the vector database composed of historical data.

In some embodiments, the preload state may be determined by a user (e.g., a driver of the vehicle). For example, the users may choose whether to perform the preload and preload pressure. In some embodiments, the preload state may further be determined by whether or not the user place foot on the brake pedal. For example, the controller may control the brake system to perform preload when the sensor detects that the user's foot is placed on the brake pedal. In some embodiments, the controller may determine the preload state through a driving mode of the vehicle. For example, when the vehicle is in an energy-saving mode, the controller may control the braking system not to perform preload. When the vehicle is in a normal driving mode or a sport mode, the controller may control the braking system to perform load according to a preset preload pressure. In some embodiments, the controller may comprehensively determine the preload state based on the above-mentioned various embodiments. For example, when the user selects to perform preload and the sensor detects that the user's foot is placed on the brake pedal, the controller may control the braking system to perform load according to the preset preload pressure.

In some embodiments of the present disclosure, comprehensively determining the preload state in various ways may obtain better preload effects for different conditions and improve a user experience.

3) An open state: when the controller receives the displacement signal of the pedal device obtained by the displacement detection system, the controller updates the optimal duty cycle $\beta_1$ and the driving frequency signal $f_1$ of the two-position two-way digital switch valve A1, and updates the optimal valve opening $\gamma$ at the same time; the two-position two-way digital switch valve A1 and the electromagnetic two-position two-way proportional reversing valve 6 quickly respond to the signal and quickly build the pressure; the load spring is further compressed from the target pre-compression volume $\Delta x1$ to a target compression volume $\Delta x2$, and a brake friction block 4 and a brake disc of the brake squeezes and rubs to achieve a braking effect. The brake pressure rises from the preload brake pressure $P_{pre}$ to the target brake pressure $P_0$ during a very short period of time, and the controller updates the optimal duty cycle $\beta_2$ and the drive frequency signal $f_2$ of the two-position two-way digital switch valve A1 to ensure that the brake pressure is maintained at the target brake pressure $P_0$, thereby achieving a precise pressure control.

When a brake instruction signal is cancelled, the brake system switches from the open state to the preload state. The brake system starts to depressurize, the brake pressure drops from a previous target brake pressure $P_0$ to the preload brake pressure $P_{pre}$, and the compression volume of the load spring returns to the target pre-compression volume $\Delta x1$, which prepares for a next brake instruction signal.

4) A closed state: when the controller detects that the vehicle is shut down, the brake system switches from the preload state to the closed state, the two-position two-way digital switch valve A1 and the electromagnetic two-position two-way proportional reversing valve 6 are closed, the oil liquid returns to the oil tank through the two-position two-way digital switch valve B7, and the compression volume of the load spring returns to 0 from the target pre-compression volume $\Delta x1$.

Figure 4:
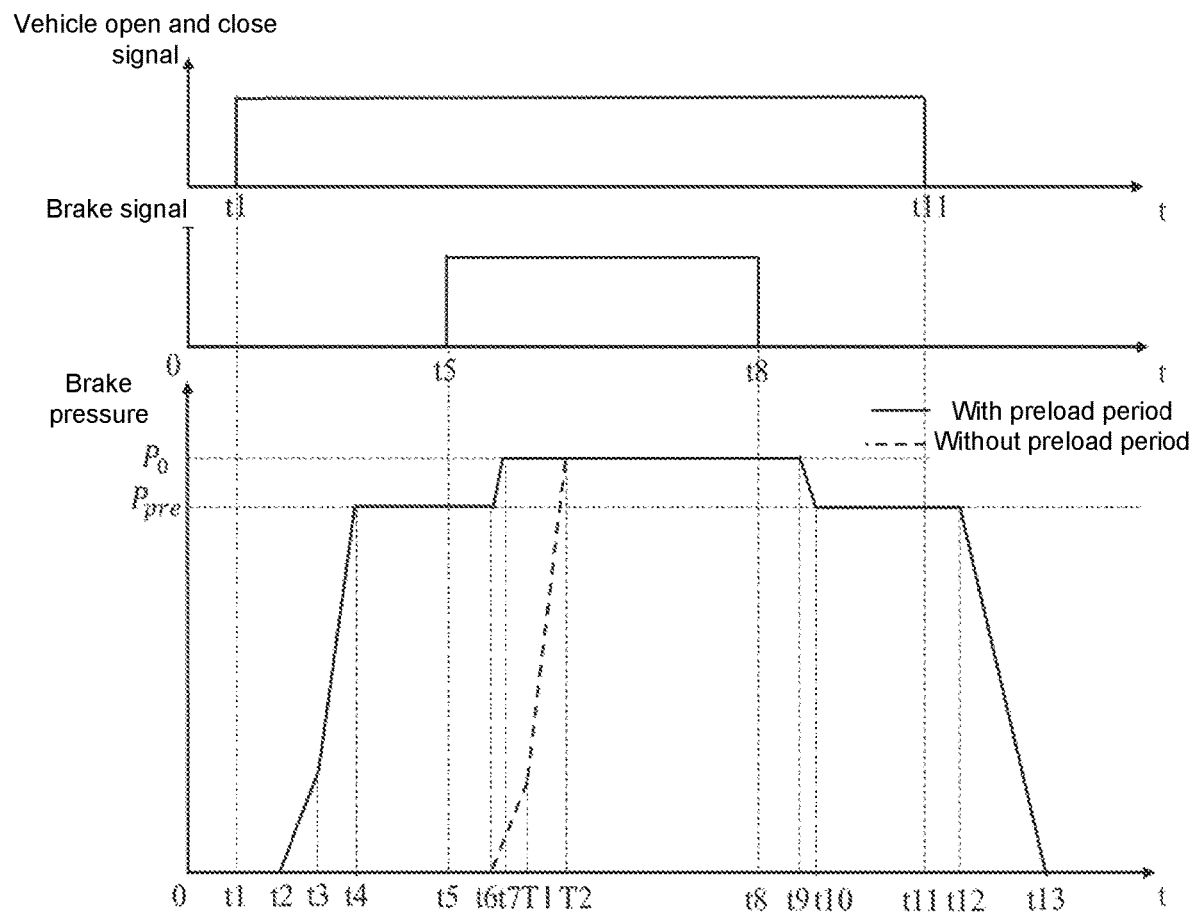
FIG. 4 is a brake pressure signal response diagram according to some embodiments of the present disclosure.

FIG. 4 shows the signal response conditions of the brake system of the present disclosure in three states. When the vehicle is started at time t1, the two-position two-way digital switching valve A1 starts to build pressure at time t2, and the electromagnetic two-position two-way proportional reversing valve 6 participates in the pressure building after crossing the dead zone at time t3, and reaches a preload specified pressure $P_{pre}$ at time t4. When a brake instruction signal comes at time t5, the two-position two-way digital switching valve A1 and the electromagnetic two-position two-way proportional reversing valve 6 quickly responds to the signal at time t6 and quickly build pressure, and reaches the target brake pressure at time t7. When the brake instruction signal is "0" at time t8, the two-position two-way digital switch valve B7 starts to respond at time t9, the excess oil returns to the oil tank through the two-position two-way digital switch valve B7, and the preload specified pressure $P_{pre}$ is reached at time t10 to get ready for the next braking response. When the vehicle is closed at time t11, the two-position two-way digital switch valve A1, the electromagnetic two-position two-way proportional reversing valve 6, and the two-position two-way digital switch valve B7 respond simultaneously at time t12, of which the two-position two-way digital switch valve A1 and the electromagnetic two-position two-way proportional reversing valve 6 are closed, the two-position two-way digital switch valve B7 is opened, and the oil in the system returns to the oil tank through the two-position two-way digital switch valve B7.

Figure 5:
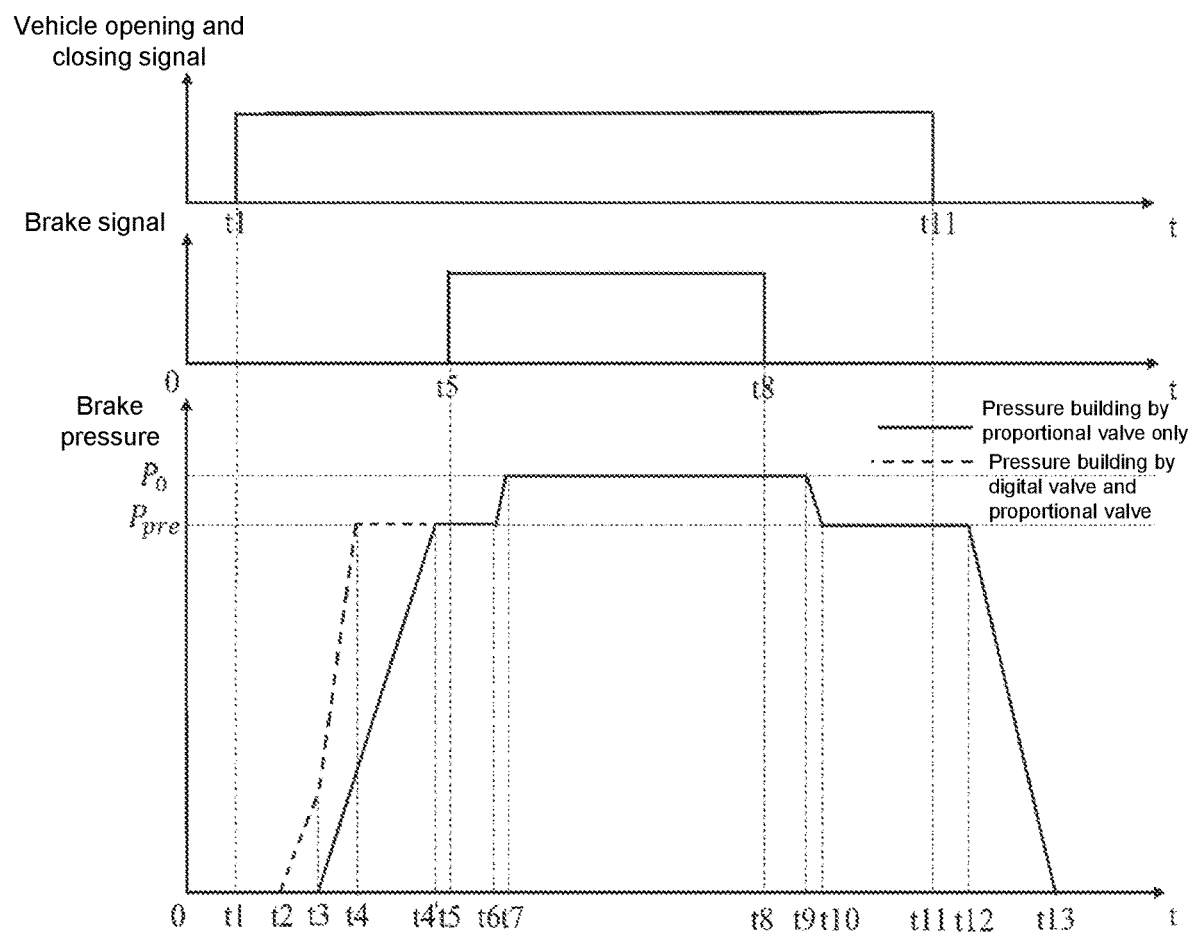
FIG. 5 is a brake pressure signal response diagram according to another embodiment of the present disclosure.

In some embodiments, a preload period may only be built pressure via the electromagnetic two-position two-way proportional reversing valve 6. FIG. 5 shows the signal response conditions of the brake system of the present disclosure in three states when the pressure is only built through the electromagnetic two-position two-way proportional reversing valve 6. When the vehicle is started at time t1, the two-position two-way digital switching valve A1 does not participate in building pressure, and the electromagnetic two-position two-way proportional reversing valve 6 participates in the pressure building after crossing the dead zone, and reaches a preload specified pressure $P_{pre}$ at time t4'. When the brake instruction signal comes at time t5, the two-position two-way digital switching valve A1 and the electromagnetic two-position two-way proportional reversing valve 6 quickly responds to the signal at time t6 and quickly build pressure, and reaches the target brake pressure at time t7. The signal response conditions of the brake system at the subsequent times (t8-t13) are the same as that in FIG. 4, and reference can be made to FIG. 4 and its related descriptions. It can be seen from FIG. 5 that when the pressure is built only through the electromagnetic two-position two-way proportional reversing valve 6, the time to reach the preload specified pressure $P_{pre}$ is extended, but the subsequent signal response is not affected. At the same time, the use of the two-position two-way digital switching valve A1 may be reduced to increase its service life.

In some embodiments, the controller may determine different preload pressure building modes according to different driving conditions of the vehicle. In some embodiments, when the current driving condition of the vehicle satisfies a second preset condition, in the preload period, the pressure building may be jointly performed by the two-position two-way digital switching valve A1 and the electromagnetic two-position two-way proportional reversing valve 6. When the current driving condition of the vehicle does not satisfy the second preset condition, in the preload period, the pressure building may be independently performed by the electromagnetic two-position two-way proportional reversing valve 6. The second preset condition may include that the user's foot is placed on the brake pedal, and/or the vehicle speed exceeds a preset threshold, etc. In some embodiments of the present disclosure, by determining different preload pressure building modes according to different driving conditions of the vehicle, the service life of the two-position two-way digital switch valve A1 may be improved while reducing the brake response time.

The above-mentioned embodiments only express several implementation modes of the present disclosure, and while the description thereof is relatively specific and detailed, but the embodiments should not be construed as limiting the patent scope of the present disclosure. For those skilled in the art, without departing from the concept of the present disclosure, several modifications and improvements can be made, and the modifications and improvements all belong to the protection scope of the present disclosure.

What is claimed is:

1. A control method of a digital hydraulic assisted braking system with high dynamic response, the braking system comprising a first two-position two-way digital switch valve (A), a controller, an electromagnetic two-position two-way proportional reversing valve, a second two-position two-way digital switch valve (B), a displacement detection system, and a pressure detection system; wherein
the controller is respectively connected to the displacement detection system and the pressure detection system to obtain a corresponding detection signal; the controller is respectively connected to the first two-position two-way digital switch valve (A), the electromagnetic two-position two-way proportional reversing valve, and the second two-position two-way digital switch valve (B) to control them, and the controller is further configured to control an external liquid filling system;
the displacement detection system is configured to obtain a displacement signal of an external pedal device; and the pressure detection system is configured to obtain a pressure signal of a brake cylinder of an external brake;
the electromagnetic two-position two-way proportional reversing valve and an oil inlet of the first two-position two-way digital switch valve (A) are connected to the external liquid filling system, wherein the oil inlet of the first two-position two-way digital switch valve (A) is further connected to an accumulator, and the electromagnetic two-position two-way proportional reversing valve and an oil outlet of the first two-position two-way digital switch valve (A) are connected to the brake cylinder of the external brake; an oil inlet of the second two-position two-way digital switch valve (B) is connected to the brake cylinder of the external brake, and an oil outlet of the second two-position two-way digital switch valve (B) is connected to an external oil tank;

the control method comprising:
1) Collecting the corresponding detection signal in real time through the displacement detection system and the pressure detection system by the controller;
2) A preload state: when a vehicle is started, transmitting a first duty cycle ($\beta_1$) and a first driving frequency signal ($f_1$) to the first two-position two-way digital switch valve (A) according to a feedback signal of the pressure detection system by the controller, and transmitting a valve opening ($\gamma$) to the electromagnetic two-position two-way proportional reversing valve by the controller; the first two-position two-way digital switch valve (A) quickly responding to build pressure; at the same time, the electromagnetic two-position two-way proportional reversing valve also starting to respond, and starting to build pressure after crossing a dead zone; oil liquid being mixed into the brake cylinder after passing through the first two-position two-way digital switch valve (A) and the electromagnetic two-position two-way proportional reversing valve; as a pressure of the brake cylinder increases, a load spring of the external brake being gradually compressed to a target pre-compression volume ($\Delta x1$), and a brake pressure being raised to a preload brake pressure ($P_{pre}$); when the brake pressure ($P_{pre}$) is reached, the controller transmitting a second duty cycle ($\beta_2$) and a second driving frequency signal ($f_2$) to the second two-position two-way digital switch valve (B), so that excess oil returns to the oil tank through the oil outlet of the second two-position two-way digital switch valve (B); when the pressure of the brake cylinder drops, the oil being replenished through the first two-position two-way digital switch valve (A) and the electromagnetic two-position two-way proportional reversing valve, and an effect of pressure control being achieved under an action of high-frequency drive;
3) an open state: when the controller receives the displacement signal of the pedal device obtained by the displacement detection system, the controller updating the first duty cycle ($\beta_1$) and the first driving frequency signal ($f_1$) of the first two-position two-way digital switch valve (A), and updating the valve opening ($\gamma$) at the same time; the first two-position two-way digital switch valve (A) and the electromagnetic two-position two-way proportional reversing valve quickly responding to the signal and quickly build the pressure; the load spring being further compressed from the target pre-compression volume ($\Delta x1$) to a target compression volume ($\Delta x2$), and a brake friction block of the external brake and a brake disc squeezing and rubbing to achieve a braking effect; the brake pressure rising from the preload brake pressure ($P_{pre}$) to a target brake pressure ($P_0$), and the controller updating the second duty cycle ($\beta_2$) and the second driving frequency signal ($f_2$) of the first two-position two-way digital switch valve (A) to ensure that the brake pressure is maintained at the target brake pressure ($P_0$), thereby achieving a pressure control;
when a brake instruction signal is cancelled, the braking system switching from the open state to the preload state; the braking system starting to depressurize, the brake pressure dropping from the target brake pressure ($P_0$) to the preload brake pressure ($P_{pre}$), and a compression volume of the load spring returning to the target pre-compression volume ($\Delta x1$), which prepares for a next brake instruction signal; and
4) a closed state: when the controller detects that the vehicle is shut down, the braking system switching from the preload state to the closed state, the, first two-position two-way digital switch valve (A) and the electromagnetic two-position two-way proportional reversing valve being closed, the oil liquid returning to the oil tank through the second two-position two-way digital switch valve (B), and the compression volume of the load spring returns to 0 from the target pre-compression volume ($\Delta x1$).

2. The control method of claim 1, wherein the controller is further configured to obtain a pressure signal of the accumulator.

3. The control method of claim 1, wherein the brake comprises the brake cylinder, the brake friction block and the brake disc, the load spring inside the brake cylinder transmitting the brake pressure to the brake friction block; and when the brake pressure reaches the target brake pressure ($P_0$), a squeeze friction is generated between the brake friction block and the brake disc.

4. The control method of claim 1, wherein a range of the first driving frequency signal ($f_1$) and the second driving frequency signal ($f_2$) is 100-300 Hz, and a range of the first duty cycle ($\beta_1$ and the second duty cycle ($\beta_2$) is 0-100%.

5. The control method of claim 1, wherein the preload brake pressure ($P_{pre}$) is 70%-85% of the target brake pressure ($P_0$).

6. The control method of claim 1, wherein when a pressure of the accumulator detected by the controller is less than the brake pressure, the controller transmits a control signal ($\alpha$) to the liquid filling system, and the liquid filling system fills the accumulator with liquid to supplement the pressure.

* * * * *